United States Patent
Wilkenhoener et al.

(10) Patent No.: US 7,700,160 B2
(45) Date of Patent: Apr. 20, 2010

(54) PROCESS FOR THE PRODUCTION OF A SCRATCH RESISTANT VEHICLE COATING

(75) Inventors: Uwe Wilkenhoener, Wuppertal (DE); Martin Wulf, Langenfeld (DE); Paer Winkelmann, Wuppertal (DE)

(73) Assignee: E.I. du Pont de Nemours and Company, Wilmington, DE (US)

( * ) Notice: Subject to any disclaimer, the term of this patent is extended or adjusted under 35 U.S.C. 154(b) by 613 days.

(21) Appl. No.: 11/509,140

(22) Filed: Aug. 24, 2006

(65) Prior Publication Data

US 2007/0196583 A1 Aug. 23, 2007

Related U.S. Application Data

(60) Provisional application No. 60/711,308, filed on Aug. 25, 2005.

(51) Int. Cl.
*B05D 7/00* (2006.01)
*B05D 1/12* (2006.01)

(52) U.S. Cl. .................. 427/402; 427/180; 427/407.1; 428/403; 428/404; 428/407; 977/778; 977/779; 977/783

(58) Field of Classification Search ............... 427/407.1
See application file for complete search history.

(56) References Cited

U.S. PATENT DOCUMENTS

| | | | |
|---|---|---|---|
| 5,591,797 A * | 1/1997 | Barthel et al. .............. 524/493 |
| 6,750,270 B1 | 6/2004 | Klostermann et al. | |
| 6,790,904 B2 | 9/2004 | White et al. | |
| 6,908,692 B1 | 6/2005 | Buhm et al. | |
| 2002/0098243 A1 | 7/2002 | Edelmann et al. | |
| 2003/0224174 A1* | 12/2003 | White et al. ............... 428/413 |
| 2005/0241531 A1 | 11/2005 | Meyer et al. | |
| 2006/0084723 A1 | 4/2006 | Hartwig et al. | |

FOREIGN PATENT DOCUMENTS

| | | |
|---|---|---|
| DE | 10239424 A1 | 3/2004 |
| DE | 10241510 A1 | 3/2004 |
| EP | 0672731 A1 | 9/1995 |
| EP | 1166283 | 1/2002 |
| EP | 1195416 A2 | 4/2002 |
| EP | 1216278 | 6/2002 |
| WO | WO03102089 | 12/2003 |
| WO | WO2004020531 A1 | 3/2004 |

* cited by examiner

*Primary Examiner*—Michael Barr
*Assistant Examiner*—Ryan Schiro
(74) *Attorney, Agent, or Firm*—Sudhir G. Deshmukh

(57) ABSTRACT

The invention is directed to a process for the production of a scratch-resistant vehicle coating comprising the following steps:

I. applying a top coat layer of colour- and/or special effect-imparting base coat and a transparent clear coat or of a pigmented one-layer top coat onto a prior coating, II. optionally, applying a sealing layer of a transparent sealing coat onto the top coat layer applied in step I and III. curing the top coat layer applied in step I and the sealing layer optionally applied in step II,
wherein the transparent clear coat or the pigmented one-layer top coat and/or the transparent sealing coat contains modified nanoparticles based on an element-oxygen network, the elements are selected from the group consisting of aluminium, silicon, tin, boron, germanium, gallium, lead and transition metals including the lanthanides and actinides and wherein the modified nanoparticles being produced by treating the (unmodified) nanoparticles with compounds of the general formula I $Me(ORI)_4$ and/or the general formula II $Me(OCOR^1)_4$, wherein $R^1$ means an alkyl, aryl and/or aralkyl residue and Me means zirconium and/or titanium.

8 Claims, No Drawings

PROCESS FOR THE PRODUCTION OF A SCRATCH RESISTANT VEHICLE COATING

CROSS-REFERENCE TO RELATED APPLICATION

This application claims priority under 35 U.S.C. §119 from U.S. Provisional Application Ser. No. 60/711,308, filed Aug. 25, 2005.

FIELD OF THE INVENTION

The invention relates to a process for the production of a scratch resistant vehicle coating, wherein the outer coating layer is produced from coating compositions containing modified nanoparticles.

DESCRIPTION OF RELATED ART

Improving the mechanical stability, such as, scratch resistance, hardness and abrasion resistance, of coatings has long been a central task, in particular for automotive top coats. It is known to improve the above-stated properties by incorporating nanoparticles into clear coats or top coats. The technical challenge here is to incorporate the necessary quantity of nanoparticles into the coatings in such a manner that the general range of properties of the coatings remains unaffected. For example, it should be ensured that properties such as, optical quality (transparency in clear coats or colour shade in pigmented coatings), rheology, flow and adhesion are not negatively affected by the use of nanoparticles.

EP 1216278, EP 1195416 and DE 10239424 describe, for example, differently structured and functionalised nanoparticles and the use thereof in coatings to impart scratch resistance.

WO 03102089 furthermore describes chemically modified nanoparticles, which are present as a dispersion in a film-forming binder. The nanoparticles are here modified by compounds of the general formula $Si(OR)_3$—$(CH_2)_n$-Z, wherein Z represents a long-chain alkyl group, a fluorocarbon group or a silane group with at least 2 methyl groups. The group Z is intended to ensure that the modified nanoparticles exhibit lower compatibility towards the binders than do the unmodified particles and so preferably congregate at the surface of the coatings containing them.

DE 10241510 describes compositions prepared from agglomerated nanoparticle powders and organic binders. The nanoparticles are here treated with compounds of the general formulae $Si(OR')_nR_{4-n}$, $SiCl_nR_{n-4}$, $(R'_mR''_{m-3}Si_2)NH$, $Ti(OR')_nR_{4-n}$ and $Zr(OR')_nR_{4-n}$, wherein R is a functional group which is attached directly via a C atom to the silicon, titanium or zirconium. In particular, the functional groups are those with unsaturated double bonds which, once the nanoparticles have been incorporated into the unsaturated monomers forming the binder, are polymerised with the monomers and give rise to a crosslinked nanocomposite.

EP 1166283 describes coating compositions for metallic conductors, in particular wires, which exhibit improved partial discharge resistance and which give rise to flexible coatings on the wires. These compositions contain particles based on an element-oxygen network with reactive and optionally, unreactive functions on the surface, wherein the unreactive functions are attached via the oxygen of the network.

It has not, however, proved possible hitherto to provide nanoparticles containing coating compositions or coating processes, especially for vehicle coating which are capable of satisfactorily solving the above-stated technical problem.

There is accordingly still a requirement for coating processes for vehicle coating which yield coatings with improved scratch resistance and hardness without having to accept relatively large concessions with regard to other essential coating properties, such as, for example, rheological properties and adhesion. The scratch resistant coatings should moreover be of perfect optical appearance and be readily sandable and polishable.

SUMMARY OF THE INVENTION

The invention relates to a process for the production of a scratch resistant vehicle coating, comprising the following steps:

I. applying a top coat layer of colour- and/or special effect-imparting base coat and a transparent clear coat or of a pigmented one-layer top coat onto a prior coating, II. optionally, applying a sealing layer of a transparent sealing coat onto the top coat layer applied in step I and III. curing the top coat layer applied in step I and the sealing layer optionally applied in step II, wherein the transparent clear coat or the pigmented one-layer top coat and/or the transparent sealing coat contains modified nanoparticles based on an element-oxygen network, the elements are selected from the group consisting of aluminium, silicon, tin, boron, germanium, gallium, lead and transition metals including the lanthanides and actinides and wherein the modified nanoparticles being produced by treating the (unmodified) nanoparticles with compounds of the general formula I $Me(OR^1)_4$ and/or the general formula II $Me(OCOR^1)_4$, wherein $R^1$ means an alkyl, aryl and/or aralkyl residue and Me means zirconium and/or titanium. Me and $R^1$ can be each selected independently in formula I and II.

The elements of the element-oxygen network preferably comprise titanium, aluminium, silicon, zirconium, zinc, tin, yttrium, cerium and vanadium. It is also possible to use mixtures of particles from different element-oxygen networks and it is also possible to use particles based on hybrid networks of oxygen and more than one of the stated elements, e.g., particles based on silicon-aluminium-oxygen networks.

It has surprisingly been found that coatings with improved mechanical properties, in particular improved scratch resistance, may be obtained using the process according to the invention. The existing advantageous properties of coatings which do not result from compositions modified with nanoparticles are retained. The effect on the rheological behaviour of the coatings is minimal, the transparency of resultant clear coats is very good, the colour of pigmented coatings is unchanged and the surface structure of the coating is not impaired. There is also no discernible negative influence on the development of hardness during drying.

DETAILED DESCRIPTION OF THE EMBODIMENTS

The following more detailed explanation relates first of all to the coatings containing nanoparticles to be applied according to the invention in step I and optionally, step II. The top coats to be applied according to the invention, i.e., the clear coats or pigmented one-layer top coats and/or the sealing coats optionally to be applied contain modified nanoparticles. The modified nanoparticles comprise nanoparticles based on an element-oxygen network of the above-stated type, which have been treated with the above-stated compounds of general formula I and/or II.

In general formula I $Me(OR^1)_4$ and general formula II $Me(OCOR^1)_4$ the residue $R^1$ has the following meaning:

$R^1$ may be an alkyl residue, the alkyl residue comprising an optionally substituted linear or branched alkyl residue with 1-20, preferably with 1-12, particularly preferably with 1-6 C atoms. The alkyl residue may be substituted with any desired organic groups, for example, with acid groups, hydroxyl groups and amino groups.

$R^1$ may likewise be an aryl residue, the aryl residue comprising aromatic hydrocarbon residues such as, for example, phenyl and naphthyl residues.

$R^1$ may also be an aralkyl residue, the aralkyl residue comprising alkyl residues substituted by aryl groups, such as, benzyl residues, phenylalkyl residues with 1-10 C atoms in the alkyl residue, for example, phenylethyl residues. The alkyl residues may here also be substituted in the above-stated manner.

The residues $R^1$ in the general formula I and II preferably comprise identical residues $R^1$ in one formula, but combinations of different residues $R^1$ in one formula may also be present.

$R^1$ is preferably a lower alkyl residue with 1-6 C atoms, such as, for example, a methyl, ethyl, propyl, isopropyl, butyl, isobutyl, pentyl or hexyl residue.

Zirconium and/or titanium compounds of the general formula I are preferably used.

Preferred compounds of general formula I are tetrapropyl titanate, tetrapropyl zirconate, tetrabutyl titanate, tetrabutyl zirconate, tetrapentyl titanate and tetrapentyl zirconate.

Examples of compounds of general formula II are titanium and zirconium esters of organic acids.

The modification of the nanoparticles with the zirconium and/or titanium compounds of the general formula I and/or II will now be described in greater detail. Both here and below, the above-described zirconium and/or titanium compounds of the general formula I and/or II will be designated compounds of the general formula I and/or II.

One possible production method involves initially introducing the compounds of the general formula I and/or II to be used for modification in one or more organic solvents. Organic solvents which may be used are conventional organic solvents for coatings, such as, for example, glycol ethers, such as, ethylene glycol dimethyl ether; propylene glycol dimethyl ether; glycol ether esters, such as, ethylene glycol monoethyl ether acetate, ethylene glycol monobutyl ether acetate, 3-methoxy-n-butyl acetate, diethylene glycol monobutyl ether acetate, methoxypropyl acetate, esters, such as, butyl acetate, isobutyl acetate, amyl acetate; ketones, such as, methyl ethyl ketone, methyl isobutyl ketone, cyclohexanone, isophorone, aromatic hydrocarbons (for example, with a boiling range of 136-180° C.) and aliphatic hydrocarbons. The compounds of the general formula I and/or II may here be mixed with the organic solvent(s) by stirring, for example, at 10-100° C., in a suitable unit. The nanoparticles or nanoparticle agglomerates may then be sprinkled into the mixture obtained in this manner, preferably with stirring and in small portions. This may proceed for example, at 10-100° C. over a few minutes to several hours.

It is, however, also possible initially to prepare a suspension of the nanoparticles in one or more organic solvents and then to add the compounds of the general formula I and/or II.

The resultant mixture may then be predispersed in a suitable unit, for example, a high-speed mixer, and dispersed down to a desired particle size in a suitable manner, for example, in a bead mill, by means of a jet disperser or by means of ultrasound. Dispersion is performed, for example, down to a particle size of 1-200 nm, preferably of 1-70 nm.

The nanoparticles are treated, for example, with 1-40 wt. %, preferably with 1-20 wt. %, of the compounds of the general formula I and/or II, relative to the quantity of nanoparticles. The quantity of compounds of the general formula I and/or II to be used here vitally depends on the selected nanoparticles. The preparation of the modified nanoparticles in the organic phase as described above is preferably used to prepare nanoparticles modified with compounds of the general formula I.

The nanoparticles based on the above specified element-oxygen-network to be used comprise conventional particles known to the person skilled in the art in the "nanometer" size range, for example, with an average primary particle size of 1 to 200 nm, preferably of 1 to 100 nm, which may contain functional groups, in particular hydroxyl groups, on the particle surface. Usable nanoparticles are based, e.g., on silica, titanium dioxide, aluminium oxide, zinc oxide and cerium oxide. The silica can be used in any suitable form, preferred is pyrogenic silica. The nanoparticles are obtainable as commercial products. Examples for commercial products based on silica are Aerosil® R300, R380, R805, R812, R7200 and R8200 from Degussa, Cab-O-Sil® TS-610 and Cab-O-Sil® TS-530 from Cabot Corporation and HDKN20, HDK H 15, HDK H 18 and HDK H 30 from Wacker. Examples for commercial nanoparticles based on titanium dioxide are Aeroxide® TiO2-T805 from Degussa and various grades under the name Hombitec from Sachtleben. Examples for commercial nanoparticles based on aluminium oxide are Aeroxide® -Alu C805 from Degussa and Nano-Tek® Aluminium oxide from Nanophase Inc.

In a further preferred embodiment according to the invention, the nanoparticles may be modified with the compounds of the general formula I and/or II in combination with the treatment with silane compounds. The silane compounds may, for example, comprise compounds of the general formula $Si(OR^2)_n R^3_{4-n}$, with n=1, 2, 3 or 4, wherein $R^2$ has the meaning of $R^1$, and $R^3$ represents any desired organic group, which is directly attached to the silicon via a carbon atom. If n is equal to 1 or 2, $R^3$ may be identical or different, and if n is equal to 2, 3 or 4, $R^2$ may be identical or different. Preferably, silane compounds are used in which n is equal to 4 $(Si(OR^2)_4)$, wherein $R^2$ has the meaning already stated above and may be identical or different. Treatment with the silane compounds may proceed in parallel with or preferably after treatment with the compounds of the general formula I and/or II. In any event, such treatment should proceed before the grinding process.

One embodiment according to the invention which is particularly preferred is that in which the obtained modified nanoparticles are additionally incorporated into specific functional compounds and are then jointly predispersed and ground together with these functional compounds. It is assumed that, when the nanoparticles are modified according to the invention with compounds of the general formula I and/or II, not all functional groups of these compounds, e.g., —$OR^1$ groups, are bound to the surface of the nanoparticles and free groups —$OR^1$ are still retained. It is further assumed that, with the assistance of these still free groups, the nanoparticles may be bound to specific functional compounds, whether by chemical reaction or coordinative attachment.

The functional compounds comprise mono- and/or polyfunctional monomeric, oligomeric and/or polymeric compounds which contain functional groups which are intended to be capable of binding to those reactive groups, e.g., $OR^1$ groups, of the nanoparticles which are still present. Suitable functional groups which may be considered are any desired organic groups with Lewis basicity, such as, for example, OH, COOH, amino, thiol, carbamate, imido, epoxide, isocyanate and/or ester groups. Correspondingly, functionalised oligomeric or polymeric binders and/or other correspondingly functionalised compounds may be used. For example, hydroxy-functional or carboxy-functional binders and/or other hydroxy- or carboxy-functional compounds, for example, mono- or polyhydric longer-chain linear or branched alcohols, for example, mono- or polyhydric aliphatic alcohols with 5 to 20 C atoms may be used.

Functionalised compounds which may particularly advantageously be used are such correspondingly functionalised binders, for example, hydroxy-functional binders, which are also a constituent or preferably the main constituent of the coating binder system into which the modified nanoparticles are to be incorporated. Stable masterbatches containing nanoparticles are obtained, which may be directly incorporated into a coating system without any problems. Improved deagglomeration and thus dispersion of the nanoparticles in the coating system is obtained.

The nanoparticle masterbatches may, for example, be produced by mixing and predispersing the modified nanoparticles with the functionalised compounds, in particular, the functionalised binders, in a high-speed mixer and then continuing dispersing in suitable units, for example, by means of a bead mill. The functionalised compounds, in particular the functionalised binders, may here initially be introduced and the modified nanoparticles added thereto or the modified nanoparticles may initially be introduced and the functionalised compounds, in particular, the functionalised binders, added thereto. At variance with these variants, it is, however, also possible, to perform the treatment/modification according to the invention of the nanoparticles with the compounds of the general formula I and/or II in the presence of the functionalised compounds. The functionalised compounds can be present as organic solution or organic dispersion.

The nanoparticles and the functionalised compounds, in particular, the functionalised binders, may here be used in a ratio by weight of functionalised compound: modified nanoparticles of 99:1, preferably of 80:20 as an upper limit. The lower limit of the ratio by weight may be considered to be the ratio by weight of functionalised compound: modified nanoparticles corresponding to the critical pigment volume concentration (CPVC), i.e., the quantity of functionalised compound which is just sufficient adequately to wet a specific quantity of nanoparticles. It may, for example, comprise a ratio by weight of functionalised compound: modified nanoparticles of 80:20 to 50:50.

Ideally, the functionalised compounds, in particular the functionalised binders, are here used in a quantity and the conditions selected such that as far as possible all the reactive groups still present on the nanoparticle surface may be consumed by reaction with the corresponding functional groups of the binder. Any unreacted functional groups of the binder which are optionally still present may then, in the presence of an appropriate crosslinking agent in the coating composition, react with the reactive groups of the crosslinking agent and so participate in the crosslinking process.

Dispersion of the nanoparticle masterbatches proceeds down to a desired particle size of for example, 1-200 nm, preferably 1-70 nm.

In the absence of water, the resultant nanoparticle masterbatches exhibit excellent storage stability within a wide temperature range, for example, from −15 to 80° C.

Self-evidently, all the above-described embodiments according to the invention may be used alone or combined with one another in any desired manner.

The nanoparticle-containing coating compositions to be used according to the invention (i.e., the clear coats, one-layer top coats or sealing coats) comprise A) at least one film-forming binder,
B) optionally, at least one crosslinking agent for the binder,
C) 0.5-40 wt. %, preferably 1-20 wt. %, relative to the quantity of film-forming binder A), of the above-described nanoparticles based on an element-oxygen network and
D) optionally, organic solvents, water, pigments, fillers and conventional coating additives.

Selection of the film-forming binders A) and optionally present crosslinking agents B) in the coating compositions according to the invention is not subject to any particular restriction. Any desired binders conventionally usable in coatings production may be used. The binders A) may comprise, for example, polyesters, polyurethanes, (meth)acrylic copolymers, epoxy resins and mixtures as well as hybrids of the stated binders. The listing is, however, not intended to constitute a limitation. Polymers other than those stated may also be used. The binders A) may comprise functional groups. When functional groups are present, the binders preferably have at least two functional groups per molecule.

Non-limiting examples of functional groups which may be present in the binders A) are epoxy groups, carboxyl groups, hydroxyl groups, amino groups, isocyanate groups, olefinically unsaturated groups, alkoxysilane groups. The functional groups may here also be present in blocked form, for example, as blocked hydroxyl groups, isocyanate groups or amino groups.

Production of the optionally functionalised binders A) is sufficiently known to the person skilled in the art and requires no explanation.

The binders A) may be self- or externally crosslinking. They may, however, also comprise physically drying binders.

In addition to the binders A), the coating compositions according to the invention may contain crosslinking agents B) which are capable of entering into a crosslinking reaction with functional groups of the binders A).

Selection of the crosslinking agents is guided by the functional groups present in the binders A), i.e., the crosslinking agents are selected such that they exhibit a reactive functionality complementary to the functionality of the binders, wherein the functional groups may react with one another by free-radical polymerisation and/or by addition and/or condensation.

Examples of addition reactions between binders A and crosslinking agents B) are the ring-opening addition of an epoxy group onto a carboxyl group with formation of an ester group and a hydroxyl group, the addition of a hydroxyl and/or primary and/or secondary amino group onto an isocyanate group with formation of a urethane group and/or urea group, the addition of a primary and/or secondary amino group and/or CH-acidic group onto an alpha,beta-unsaturated carbonyl group, in particular (meth)acryloyl group, the addition of a primary and/or secondary amino group onto an epoxy group. Examples of condensation reactions between (A) and (B) groups are the reaction of a hydroxyl and/or primary and/or secondary amino group with a blocked isocyanate group with formation of a urethane group and/or urea group and elimination of the blocking agent, the reaction of a hydroxyl group with an n-methylol group with elimination of water, the reaction of a hydroxyl group with an n-methylol ether group with elimination of the etherification alcohol, the transesterification reaction of a hydroxyl group with an ester group with elimination of the esterification alcohol, the transurethanisation reaction of a hydroxyl group with a carbamate group with elimination of alcohol, the reaction of a carbamate group with an n-methylol ether group with elimination of the etherification alcohol. Examples of functional groups (A) and (B) capable of reacting by means of free-radical polymerisation are olefinically unsaturated groups, for example, vinyl groups, allyl groups, in particular (meth)acryloyl groups.

Providing that they are mutually compatible, two or more complementary functionalities may simultaneously be present in a binder curable by addition and/or condensation reactions, such that curing may proceed via two or more different reactions of the types stated above by way of example.

The coating compositions according to the invention contain 0.5-40 wt. %, preferably 1-20 wt. %, relative to the quantity of film-forming binder A), of the above-described modified nanoparticles. All the previously described possible embodiments of the nanoparticles are, of course, also included.

The modified nanoparticles may additionally, as already explained above, particularly preferably be incorporated into functionalised compounds. It is particularly advantageous here, as has also already been explained above, to use as the functionalised compounds correspondingly functionalised binders, for example, hydroxy-functional binders, which are also a constituent or preferably the main constituent of the binder system of the coating composition. Functionalised binders which may accordingly be considered in principle are also those which have already been described above for use in the coating compositions.

The nanoparticle masterbatches may here be produced directly during base formulation of the coating composition and be incorporated into the coating composition, but they may, however, also be produced and stored as semifinished products and then incorporated into finished coating compositions when required. Generally the modified nanoparticles can be incorporated into the coating compositions as such or in the form of the above described masterbatches. Preferably the nanoparticles and nanoparticle masterbatches are prepared in the organic phase, as described above, and then incorporated in a suitable manner into water-based or solvent-based coating compositions.

The nanoparticle-containing coating compositions to be used according to the invention may contain pigments and/or fillers and conventional coating additives in conventional coating quantities.

In the case of application as a clear coat or transparent sealing coat, no colour- and/or special effect-imparting pigments are contained therein.

The coating compositions may contain conventional coating organic solvents and/or water, i.e., the coating compositions may be water- or solvent-based, wherein the water-based coating compositions may still contain small proportions of organic solvents.

Aqueous coating compositions may, for example, assume emulsion form. The emulsified state may here be achieved by the addition of external emulsifiers or the systems may contain groups having a self-emulsifying action in water, for example, ionic groups.

The nanoparticle-containing coating compositions may be formulated as one- or two-component coating systems, depending on the binders and crosslinking agents selected. Preferred examples of one- or two-component coating compositions are those which contain hydroxy-functional binders, such as, hydroxy-functional (meth)acrylic copolymers, polyester resins and/or polyurethane resins as binder and, as crosslinking agents, triazine-based components, for example, tris(alkoxycarbonylamino)triazine, which crosslink with the hydroxyl groups of the binders to form ether and/or ester groups, amino resins, in particular melamine resins, and/or transesterification crosslinking agents and/or free or blocked polyisocyanates. Further preferred one- or two-component coating systems are those which contain epoxy-functional binders in combination with carboxy-functional crosslinking agents.

In step I of the process according to the invention, a top coat layer of a colour- and/or special effect-imparting base coat and a transparent clear coat or of a pigmented one-layer top coat is applied onto a prior coating. Optionally, a final transparent sealing layer, e.g. for additional protection of mechanically particularly heavily loaded points on the body, which are thus at particular risk of scratching, may also be applied in a further step (step II) to the applied top coat layer. Examples of areas of a motor vehicle which are at particular risk of scratching in service are the areas around the locks or door handles together with the edges of loading areas or door openings, in particular for example, where sills jut out beneath door openings, which are at particular risk of scratching when occupants get into or out of the vehicle. Further examples of areas of an automotive body which are at risk of scratching are areas which are suitable for accommodating external loads, for example, the roof or hatchback.

In step III of the process according to the invention, the applied coating layers are then cured, wherein each layer may be cured separately after application thereof or two or more coating layers are applied one after the other without intermediate curing and are jointly cured.

The coating compositions to be applied may be applied by conventional application methods. Examples of application methods are brushing, roller application, knife coating, dipping, but in particular spraying. After an optional flash-off phase, the coating layers may then be cured or the next coating layer is applied. Depending on the composition of the coating compositions according to the invention, curing may proceed at room temperature or be forced at elevated temperatures, for example, 40 to 80° C., or by stoving (baking) at higher temperatures, for example, 80 to 220° C. In the case of radiation-curable coating compositions according to the invention, curing proceeds by exposure to high-energy radiation, for example, UV radiation, or, in the case of so-called dual cure coating compositions, by exposure to high-energy radiation and heat.

In the process according to the invention, the coating compositions are conventionally applied onto a prior coating. The prior coating comprises coating layers as are conventionally applied in vehicle coating prior to application of the top coat layer, for example, filler and/or primer coats. In the case of a top coat layer of a colour- and/or special effect-imparting base coat and a transparent clear coat, first of all the base coat layer and then the clear coat layer are applied in conventional manner.

The coating compositions modified with nanoparticles are used in the process according to the invention for the production of the outer coating layer of the multilayer structure. As has already been mentioned, the outer coating layer comprises pigmented or unpigmented coating layers, which are made up of a pigmented top coat or a transparent clear coat. Optionally, a sealing layer may additionally be applied to the top coat layer as the outer layer. It is then possible for just the coating composition constituting the sealing layer to contain the above-described nanoparticles or for the top coat layer located therebelow, i.e., the clear coat layer or the pigmented one-layer top coat layer, additionally also to contain the stated nanoparticles. The sealing layer may be applied onto the already cured top coat layer or wet-on-wet onto the top coat layer, preferably after a flash-off phase. The curing conditions correspond to those already stated above.

The process according to the invention for vehicle coating may advantageously be used both in vehicle original coating and in vehicle repair coating.

It has proved possible to use the process according to the invention to produce coatings which exhibit very good mechanical surface qualities, in particular improved scratch resistance and chemical resistance. It has proved possible to achieve these advantageous properties without having to accept impairment of other important properties of the coating compositions or of the coatings obtained therefrom, such as, for example, colour matching, transparency, rheological properties, flow, adhesion and development of hardness. The coatings obtained exhibit a good optical appearance and are also readily polishable and sandable.

The nanoparticles, in particular the nanoparticles in the form of nanoparticle masterbatches, exhibit no compatibility problems between the nanoparticles and further binder or coating composition constituents, whether during production, storage or during or after the incorporation thereof into coating compositions or during or after application of the coating compositions. It has proved possible to achieve an improvement in the dispersion and deagglomeration of the nanoparticles. The masterbatches and coating compositions containing the nanoparticles are stable in storage.

What is claimed is:

1. A process for the production of a scratch-resistant vehicle coating comprising the following steps:
   I. applying a top coat layer of a colour- and/or special effect-imparting base coat and a transparent clear coat or of a pigmented one-layer top coat onto a prior coating,
   II. optionally, applying a sealing layer of a transparent sealing coat onto the top coat layer applied in step I and
   III. curing the top coat layer applied in step I and the sealing layer optionally, applied in step II, wherein the transparent clear coat or the pigmented one-layer top coat and/or the transparent sealing coat contains modified nanoparticles based on an element-oxygen network, the elements are selected from a group consisting of aluminium, silicon, tin, boron, germanium, gallium, lead and transition metals including the lanthanides and actinides and wherein the modified nanoparticles being produced by treating the (unmodified) nanoparticles with compounds of the general formula I $Me(OR^1)_4$ and/or the general formula II $Me(OCOR^1)_4$ wherein $R^1$ is an alkyl, aryl and/or aralkyl residue and Me is zirconium and/or titanium, and wherein said modified nanoparticles are jointly predispersed and ground together with functional compounds functionalized with hydroxy, carboxy, or a combination thereof, said functional compounds being functional oligomeric compounds, functional polymeric compounds, or combination thereof wherein said functional monomeric compounds, said functional oligomeric compounds, and said functional polymeric compounds are functionalized with hydroxy, carboxy, or a combination thereof.

2. A process according to claim 1, wherein the elements are selected from the group consisting of titanium, aluminium, silicon, zirconium, zinc, tin, yttrium, cerium and vanadium.

3. A process according to claim 1, wherein the coating compositions containing the modified nanoparticles comprise the following components:
   A) at least one film-forming binder,
   B) optionally, at least one crosslinking agent for the binder,
   C) 0.5-40 wt. %, relative to the quantity of film-forming binder A), of the modified nanoparticles and
   D) optionally, organic solvents, water, pigments, fillers and/or conventional coating additives.

4. A process according to claim 3, wherein 1-20 wt. % of the modified nanoparticles C), relative to the quantity of film-forming binder A), are contained in the coating composition.

5. A process according to claim 1, wherein $R^1$ means a residue selected from a the group consisting of optionally substituted linear or branched alkyl residue with 1-20 C atoms, phenyl, naphthyl, benzyl and phenylalkyl residue with 1-10 C atoms in the alkyl residue.

6. A process according to claim 1, wherein $R^1$ means an alkyl residue with 1-6 C atoms.

7. A process according to claim 1, wherein the modified nanoparticles being produced by treating the (unmodified) nanoparticles with 1-40 wt.-% of compounds of the general formula I and/or II, relative to the quantity of the nanoparticles.

8. A process according to claim 1, wherein treatment of the nanoparticles with the compounds of the general formula I and/or II proceeds in combination with the treatment with silane compounds of the general formula $Si(OR^2)_nR^3_{4-n}$, wherein n=1, 2, 3 or 4, wherein $R^2$ has the meaning of $R^1$, and $R^3$ represents any desired organic group, which is attached directly to the silicon via a carbon atom.

* * * * *